(12) United States Patent
Farley

(10) Patent No.: US 10,591,366 B2
(45) Date of Patent: Mar. 17, 2020

(54) TEMPERATURE CALIBRATION SYSTEM WITH SEPARABLE COOLING ASSEMBLY

(71) Applicant: Fluke Corporation, Everett, WA (US)

(72) Inventor: David W. Farley, Orem, UT (US)

(73) Assignee: Fluke Corporation, Everett, WA (US)

( * ) Notice: Subject to any disclaimer, the term of this patent is extended or adjusted under 35 U.S.C. 154(b) by 222 days.

(21) Appl. No.: 15/668,407

(22) Filed: Aug. 3, 2017

(65) Prior Publication Data

US 2019/0041274 A1 Feb. 7, 2019

(51) Int. Cl.

| | | |
|---|---|---|
| *G01K 15/00* | (2006.01) | |
| *F25D 19/00* | (2006.01) | |
| *F28D 15/02* | (2006.01) | |
| *F28D 15/06* | (2006.01) | |
| *G05D 23/13* | (2006.01) | |
| *H02K 9/00* | (2006.01) | |
| *G05D 23/19* | (2006.01) | |
| *G05D 23/24* | (2006.01) | |

(52) U.S. Cl.
CPC ......... *G01K 15/005* (2013.01); *F25D 19/006* (2013.01); *F28D 15/0266* (2013.01); *F28D 15/06* (2013.01); *G01K 15/00* (2013.01); *G05D 23/1326* (2013.01); *H02K 9/005* (2013.01); *G05D 23/1909* (2013.01); *G05D 23/2401* (2013.01)

(58) Field of Classification Search
CPC .... F16K 31/002; F28D 15/06; F28D 15/0266; F28F 2255/04; F28F 2265/10; H01L 23/427; H01L 23/34; H01L 23/345
USPC ................................ 374/1, 141, 10–12, 3.29
See application file for complete search history.

(56) References Cited

U.S. PATENT DOCUMENTS

| | | | |
|---|---|---|---|
| 8,342,742 B2 | 1/2013 | Harslund et al. | |
| 2005/0172644 A1 | 8/2005 | Zhang et al. | |
| 2006/0231235 A1* | 10/2006 | Yamanaka | ................ F01N 5/02 165/51 |
| 2008/0121389 A1 | 5/2008 | Zillmer | |
| 2010/0101753 A1* | 4/2010 | Harslund | .............. F25D 19/006 165/11.1 |

(Continued)

FOREIGN PATENT DOCUMENTS

| | | |
|---|---|---|
| DK | 2006 01205 A | 3/2008 |
| WO | 2008/034442 A2 | 3/2008 |

OTHER PUBLICATIONS

Extended European Search Report, dated Dec. 11, 2018, for European Application No. 18187206.0-1001, 7 pages.

*Primary Examiner* — Gail Kaplan Verbitsky
(74) *Attorney, Agent, or Firm* — Seed Intellectual Property Law Group LLP

(57) ABSTRACT

Generally described, embodiments are directed to a temperature calibration system that includes a closed fluidic system and a cooling assembly configured to remove heat from the closed fluidic system. The cooling assembly is configured to move between a coupled position, in which the cooling assembly is thermally coupled to (e.g., abutting) a condenser of the closed fluidic system, and a decoupled position, in which the cooling assembly is thermally decoupled (e.g., spaced apart) from the condenser of the closed fluidic system. In at least one embodiment, while in the decoupled position, components of the cooling assembly may be protected from damage that may occur at elevated temperatures.

20 Claims, 3 Drawing Sheets

(56) References Cited

U.S. PATENT DOCUMENTS

2010/0132925 A1  6/2010  Lewis

* cited by examiner

TEMPERATURE CALIBRATION SYSTEM WITH SEPARABLE COOLING ASSEMBLY

BACKGROUND

Technical Field

Embodiments are directed to a temperature calibration system that utilizes a closed fluidic system, such as a thermosiphon or heat pipe.

Description of the Related Art

Many temperature calibration systems utilize a closed fluidic system for removing heat from a calibration unit. Typically, the closed fluidic system is a thermosiphon (or a heat pipe) that transfers fluid in the closed system undergoing phase changes between a liquid state and a vapor or gaseous state. The thermosiphon may further be coupled to a cooling assembly to aid in removing heat from the calibration unit. In general, thermosiphons and cooling assemblies perform well when operating at lower temperatures (e.g., below ambient) but are limited in performance when operating at higher temperatures, such as temperatures above ambient. At these higher temperatures, pressure in the system can cause damage to the cooling assembly used to help cool the fluid in the thermosiphon.

To prevent damage to the cooling assembly, some existing temperature calibration systems have limited the upper temperature limit of the operating ranges of the system. Other temperature calibration systems utilize an expansion tank that is in fluid communication with a condenser of the thermosiphon. As fluid in the thermosiphon rises above a threshold temperature, fluid in a gaseous state migrates through a port at an upper end of the condenser to the expansion tank, which is located below the condenser. When temperatures in the condenser reduce, the gas migrates back to the condenser and the thermosiphon continues to operate as usual. Alternative solutions, however, are desired.

BRIEF SUMMARY

Generally described, embodiments are directed to a temperature calibration system that includes a closed fluidic system and a cooling assembly configured to remove heat from the closed fluidic system. The cooling assembly is configured to move between a coupled position, in which the cooling assembly is thermally coupled to (e.g., abutting) a condenser of the closed fluidic system, and a decoupled position, in which the cooling assembly is thermally decoupled (e.g., spaced apart) from the condenser of the closed fluidic system. In at least one embodiment, while in the decoupled position, components of the cooling assembly may be protected from damage that may occur at elevated temperatures.

One embodiment is directed to a temperature calibration system comprising a calibration unit and a closed fluidic system. The calibration unit is configured to receive one or more device elements to be calibrated. The closed fluidic system includes a condenser and an evaporator and is configured to remove heat from the calibration unit. The temperature calibration system further includes a cooling assembly configured to move between a coupled position and a decoupled position. In the coupled position, the cooling assembly abuts the condenser, and in the decoupled position, the cooling assembly is spaced from the condenser by a gap.

Another embodiment is directed to a temperature calibration system, comprising a calibration unit configured to receive one or more device elements to be calibrated. The temperature calibration system further includes a closed fluidic system configured to remove heat from the calibration unit. The temperature calibration system further includes a cooling assembly configured to move between a coupled position, in which the cooling assembly is thermally coupled to a component of the closed fluidic system, and a decoupled position, in which the cooling assembly is thermally decoupled from the component of the closed fluidic system. The temperature calibration system includes a temperature sensor positioned to sense a temperature in the closed fluidic system. The temperature calibration system further includes a controller electrically coupled to the temperature sensor and configured to receive a first temperature signal from the temperature sensor. The first temperature signal is indicative of a first temperature in the closed fluidic system and the controller is configured to compare the first temperature to a first threshold temperature. The controller is configured to cause the cooling assembly to move to the decoupled position in response to the first temperature being at or above the first threshold temperature.

Yet another embodiment is directed to a method comprising using a cooling assembly coupled to a closed fluidic system to remove heat from a component of the closed fluidic system and sensing a first temperature of the closed fluidic system. The method further includes comparing the first temperature to a first threshold temperature, and in response the first temperature being equal to or greater than the first threshold temperature, moving the cooling assembly to a decoupled position in which cooling assembly is spaced apart from the component of the closed fluidic system.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Generally described, embodiments are directed to a temperature calibration system that includes a closed fluidic system and a cooling assembly configured to remove heat from the closed fluidic system. The cooling assembly is configured to move between a coupled position, in which the cooling assembly is thermally coupled to (e.g., abutting) a condenser of the closed fluidic system, and a decoupled position, in which the cooling assembly is thermally decoupled (e.g., spaced apart) from the condenser of the closed fluidic system. In at least one embodiment, while in the decoupled position, components of the cooling assembly may be protected from damage that may occur at elevated temperatures.

Figure 1A:
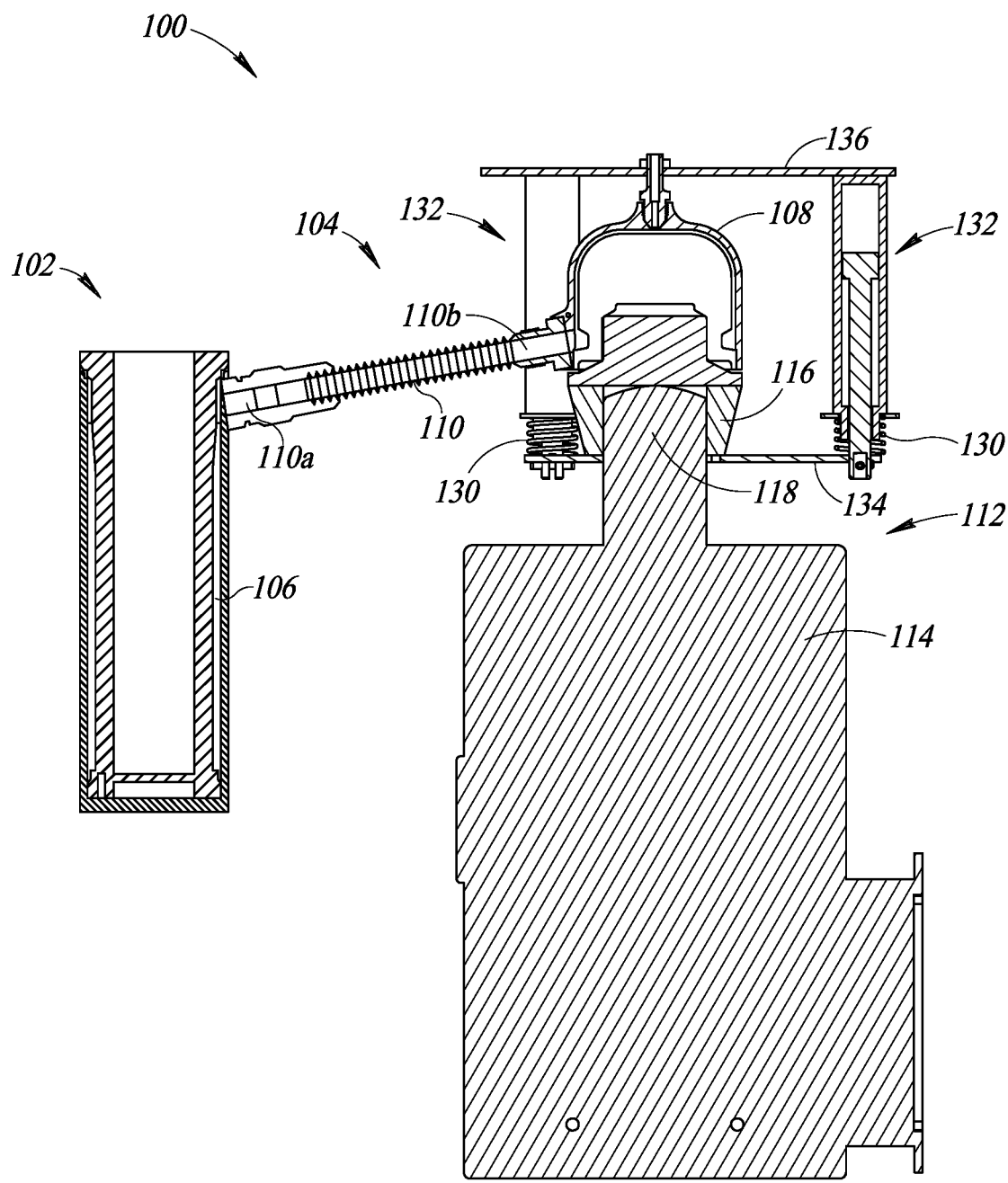
FIG. 1A is a schematic illustration of a cross-sectional view of a temperature calibration system with a cooling assembly in a coupled position in accordance with one embodiment.
Figure 1B:
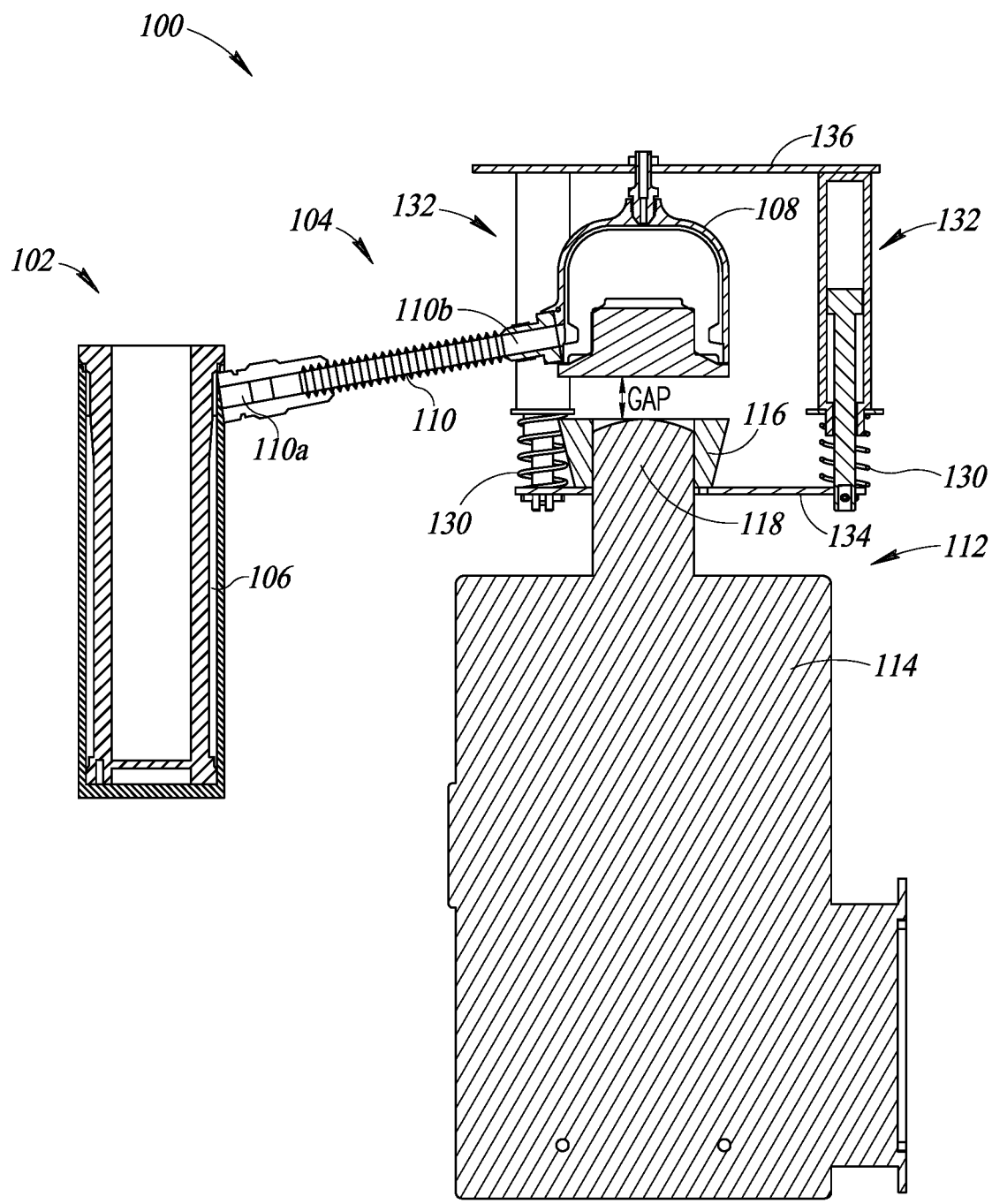
FIG. 1B is a schematic illustration of a cross-sectional view of a temperature calibration system with a cooling assembly in a coupled position in accordance with one embodiment.

FIGS. 1A and 1B show a temperature calibration system 100 in accordance with one embodiment. The temperature calibration system 100 includes a calibration unit 102 that provides a chamber with a controlled temperature over a temperature range. The temperature calibration system 100 includes a heat source 152 (FIG. 2) for heating the calibration unit 102, and a closed fluidic system, such as a thermosiphon 104 or heat pipe, for removing heat from the calibration unit 102.

In some embodiments, the calibration unit 102 is a dry calibration unit that includes a thermally conductive material, such as a metal, and includes one or more openings for receiving one or more device elements to be calibrated, such as probes or thermometers. In other embodiments, the calibration unit 102 includes a liquid bath that is heated by the heat source.

The heat source 152 is any heat source configured to heat the calibration unit 102. In some embodiments, the heat source may include Peltier elements, electrodes, cartridge heaters, or any other suitable heater(s) configured to heat the calibration unit 102.

Heat is transferred away from the calibration unit 102 by the thermosiphon 104. The thermosiphon 104 includes an evaporator 106 that is located at the calibration unit 102, a condenser 108 that is separated from the calibration unit 102, and a connecting tube 110 that places the evaporator 106 in fluid communication with the condenser 108. In particular, a first end 110a of the connecting tube 110 is coupled to a port of the evaporator 106 at the calibration unit 102, and a second end 110b of the connecting tube 110 is coupled to a port of the condenser 108. The evaporator 106, the condenser 108, and the connecting tube 110 together are a closed system containing a fluid therein. The evaporator 106 is configured to allow heat in the calibration unit 102 to transfer to the fluid, which is in a liquid form, and to cause the heated liquid to evaporate into gas. The condenser 108 is configured to cool the fluid in the gas form to cause the fluid to condense into a liquid form. The fluid in the various forms moves through the connecting tube 110 between the evaporator 106 and the condenser 108. The fluid may be any fluid or refrigerant, including water, acetone, methanol, or any other suitable fluid.

To aid the condenser 108 in cooling the fluid, the temperature calibration system 100 further includes a cooling assembly 112. The cooling assembly 112 is configured to be moved between a thermally coupled position, in which (in the illustrated embodiment) the cooling assembly 112 abuts the condenser 108 as shown in FIG. 1A, and a thermally decoupled position, in which the cooling assembly 112 is spaced from the condenser 108 by a gap as shown in FIG. 1B. In the thermally coupled position as shown in FIG. 1A, the cooling assembly 112 abuts a surface of the condenser 108 and acts as a heat sink to remove heat from the condenser 108 to aid the condenser 108 in converting the fluid in gas form therein into liquid form.

The cooling assembly 112 includes a thermally conductive cap 116 and a cooling device 114. The cooling device 114 includes a cooling element 118 that is coupled to the thermally conductive cap 116. The cooling device 114 may be an electrically driven cooling device that aids in removing heat from the condenser 108. In at least one embodiment, the cooling device 114 is a Stirling cooler and the cooling element 118 is a cooling head of the Stirling cooler. The conductive cap 116 is made a thermally conductive material, such as a metal, and acts as a heat sink to remove heat from the condenser 108.

The cooling assembly 112 may be configured to move between the coupled and decoupled positions by mechanical components, electrical components, or a combination thereof. In the illustrated embodiment, mechanical components, such as compression springs 130, are used to move the cooling assembly 112 from the coupled position to the decoupled position, and electrical components, such as linear actuators 132, are used to move the cooling assembly 112 from the decoupled position to the coupled position. Thus, although power is utilized to cause the cooling assembly 112 to move from the decoupled position to the coupled position, power is not utilized to cause the cooling assembly 112 to move from the coupled position to the decoupled position. Thus, in the event power is decoupled from the temperature calibration system 100 and the cooling assembly 112 is in the coupled position, the cooling assembly 112 will decouple from the condenser 108 by action of spring force from the compression springs 130.

The linear actuators 132, which may be linear solenoids for example, are coupled between the condenser 108 and the cooling assembly 112. In the illustrated embodiment, first ends of the linear actuators 132 are coupled to a movable component, such as a movable plate 134 coupled to the cooling assembly 112, and second ends of the linear actuators 132 are coupled to a stationary component, such as a stationary plate 136 coupled to the condenser 108.

The compression springs 130 are coupled between the condenser 108 and the cooling assembly 112. In the illustrated embodiment, the compression springs 130 have first ends coupled to the movable plate 134, but may in other embodiments be coupled directly to the cooling assembly 112. The compression springs 130 have second ends coupled to a stationary component, such as a stationary part of the linear actuators 132, but in other embodiments may be coupled to the stationary plate 136 or the condenser 108. In the illustrated embodiment, the compression springs 130 surround portions of the linear actuators 132.

The compression springs 130 and the linear actuators 132 are located radially outward of the condenser 108. In the illustrated embodiment, there are three compression springs 130 and linear actuators 132 (although FIGS. 1A and 1B depict only two of them, with one in cross-sectional view and the other in side view) that surround the condenser.

In a natural uncompressed state, the compression springs 130 are biased to hold the cooling assembly 112 away from the condenser 108 in the decoupled position as shown in FIG. 1B. The linear actuators 132 are electrically driven and, in response to receiving an electrical signal, are configured to cause the cooling assembly 112 to abut the condenser 108 in the coupled position. In particular, the linear actuators 132 compress the compression springs 130 and thereby cause the cooling assembly 112 to move to the coupled position as shown in FIG. 1A. Thus, the compression springs 130 are compressed when in the coupled position.

When in use, the cooling assembly 112 may abut the condenser 108 in the coupled position during initial operations of the temperature calibration system 100. In the event the temperature calibration system 100 is operating at elevated temperatures, such as temperatures above ambient, the cooling assembly 112 may be moved to the decoupled position. At elevated temperatures, the cooling assembly 112, such as a Stirling cooler, has limited heat sink abilities, thereby limiting the amount the cooling assembly aids in cooling the vaporized fluid in the condenser 108. Furthermore, components of the cooling assembly (in the illustrated embodiment, the Stirling cooler) can be damaged by the elevated temperatures, such as temperatures at or above 50° C. In particular, the increased temperatures result in increased pressure, which can cause fatigue and failure of various components of the Stirling cooler. Thus, by moving the cooling assembly 112 into the decoupled position, the temperature that the cooling assembly 112 is exposed to is thereby limited. In that regard, the cooling assembly 112 may be protected from damage caused by exposure to higher temperatures in the thermosiphon.

As mentioned above and shown in FIG. 1B, in the decoupled position, the cooling assembly is separated from the condenser by a gap. The gap is any suitable distance that protects components of the cooling assembly, such as the cooling head of the Stirling cooler, from the excessive heat of the condenser 108. In one embodiment for example, the gap is less than one inch and may be less than a half an inch. While the cooling assembly 112 is separated from the condenser 108 by the gap, the conductive cap 116 acts as a heatsink for the cooling head 118 and cools the cooling head.

After the condenser 108 cools, the cooling assembly 112 may be moved back into the coupled position as described above. Although not shown, the condenser 108 may be coupled to an expansion tank as referred to above to aid in alleviating fluid pressure and/or cooling the condenser 108 while the cooling assembly 112 is in the decoupled position.

Figure 2:
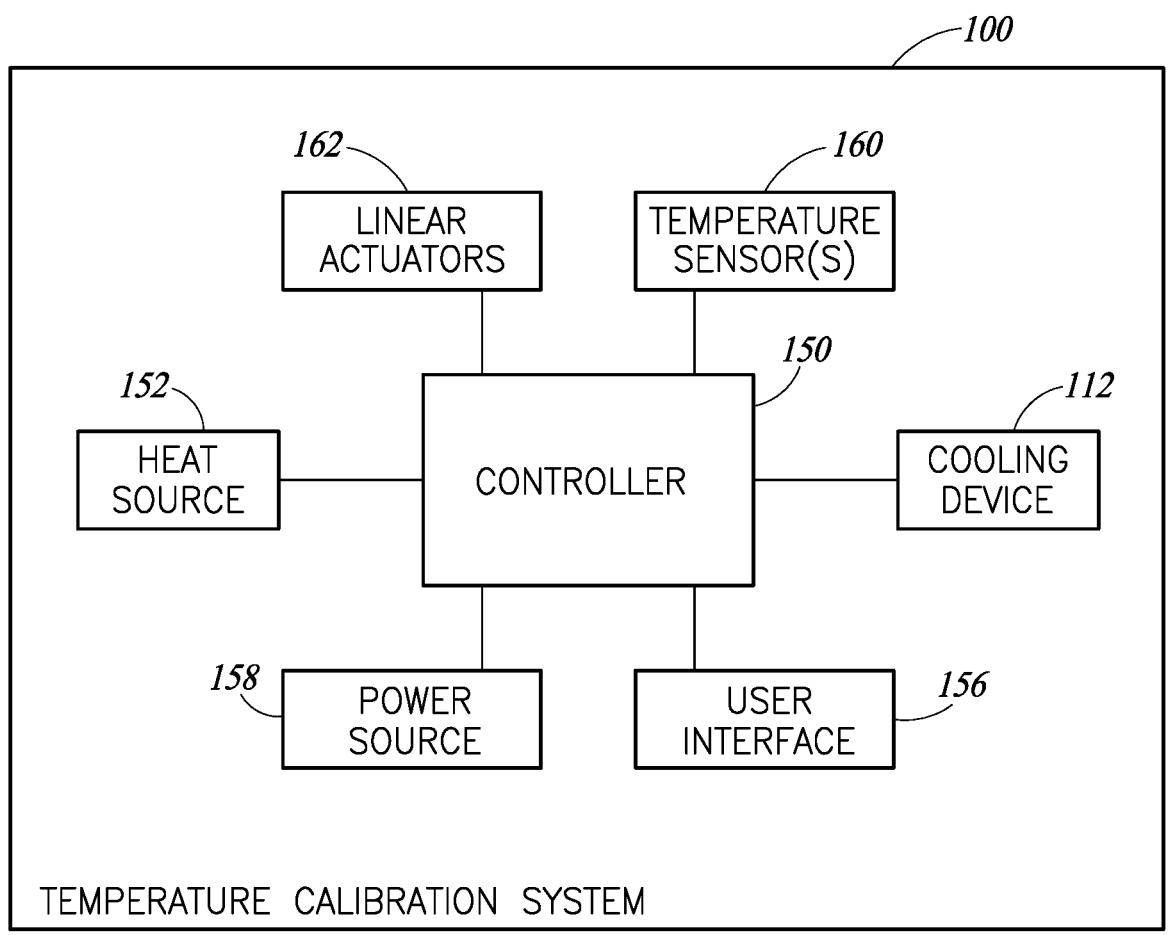
FIG. 2 is a block diagram illustrating some of the electrical components of the temperature calibration system of FIGS. 1A and 1B.

FIG. 2 is a block diagram illustrating some of the electrical components of the temperature calibration system 100 in accordance with at least one embodiment. The temperature calibration system 100 includes a controller 150 coupled to a heat source 152, a cooling assembly 112, a user interface 156, a power source 158, at least one temperature sensor 160, and linear actuators 162.

The user interface 156 may include various inputs such as a touchscreen display, keyboard, knobs and buttons that allow a user to interact with the controller 150, and outputs, such as a display and lights, for communicating with the user. For instance, the user may input a desired temperature for the calibration unit 102, which is provided to the controller 150.

The controller 150, which may be a microprocessor or other programmed or wired circuitry, includes suitable circuitry and logic for performing various functions during the operation of the temperature calibration system 100. The controller 150 is configured to activate and deactivate the heat source 152, the cooling assembly 112, and the linear actuators 162. In response to receiving the desired temperature from the user interface, the controller 150 may send a signal to the heat source 152 to activate the heat source 152. A temperature sensor 160 is configured to provide a temperature signal to the controller 150. In at least one embodiment, the temperature sensor 160 is located inside of the thermosiphon 104, such as in the condenser 108, and is configured to sense the temperature within the thermosiphon 104 or condenser 108.

The controller 150 is configured to compare the sensed temperature to one or more thresholds. In response to sensing a temperature that is above a first threshold temperature, the controller 150 may activate the cooling assembly 112. In the event the cooling assembly 112 is not in the coupled position, the controller may also activate the linear actuators 162 to cause the cooling assembly 112 to move into the coupled position. In particular, the controller 150 includes suitable circuitry and logic to provide a signal to electrically activate the cooling assembly 112 and the linear actuators 162 which cause the cooling assembly 112 to move from the decoupled position to the coupled position and thereby compress the compression springs 130.

In response to sensing a temperature at or above a second threshold temperature, the controller 150 may deactivate the linear actuators 162. In response to deactivating the linear actuators 162, the compression springs 130 move to their natural state, which thereby causes the cooling assembly 112 to move from the coupled position of FIG. 1A to the decoupled position of FIG. 1B.

The second threshold temperature may be a temperature that is below a temperature that would cause damage to the cooling assembly 112, which may be a Stirling cooler. In that regard, the cooling assembly 112, and more particularly the cooling device 114, can be decoupled from the condenser 108 before the temperature of the condenser 108 reaches temperatures known to cause damage to components of the cooling device 114. In at least one embodiment for example, the second threshold temperature is in the range of 50° C. to 60° C.

After the condenser 108 has cooled, the controller 150 may receive a temperature signal and in response to sensing a temperature below the second threshold, the controller 150 may activate the linear actuators 162, which causes the cooling assembly 112 to move into the coupled position which again compresses the compression springs 130. In some embodiments, the threshold temperatures used to activate and deactivate the linear actuators 162, and thus move the cooling assembly 112 between the coupled and decoupled positions, may be different from each other and include some hysteresis.

The power source, which can be a battery or a plug for coupling to a main power supply, provides power for operating the temperature calibration system.

As mentioned above, by using mechanical components for placing the cooling assembly in the decoupled position and electrical components to place the cooling assembly in the coupled position, the cooling assembly can be placed in the decoupled position in the event the power supplied to the temperature calibration system is disrupted. Although the springs 130 are described as compression springs, in other embodiments tension springs may be used that have a natural state that hold the cooling assembly in the coupled position and linear actuators are used to place the cooling assembly in the decoupled position. Furthermore, the springs may be separate from the linear actuators. In other embodiments, electrical components may be used to move the cooling assembly 112 between both the decoupled and coupled positions, or alternatively, mechanical components may be used to move the cooling assembly between both the decoupled and coupled positions.

Although not shown some surfaces of the abutting components described above may include a thin layer of insulation materials to keep the contact surfaces from icing up and also to maximize the thermal contact efficiency between faces during normal cooling operation.

Although a thermosiphon is described in the exemplary embodiments provided herein, a person of ordinary skill in the art understands any reference to a thermosiphon in accordance with the present disclosure may also apply to a heat pipe. Furthermore, although the actuators are shown and described as being activated by a controller, the actuators may be actuated by other means, such as hydraulics or motors.

The various embodiments described above can be combined to provide further embodiments. These and other changes can be made to the embodiments in light of the above detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A temperature calibration system, comprising:
a temperature calibration unit configured to receive one or more device elements to be calibrated;
a closed fluidic system configured to remove heat from the temperature calibration unit, the closed fluidic system including a condenser and an evaporator; and
a cooling assembly configured to move between a coupled position, in which the cooling assembly is abutting the condenser, and a decoupled position, in which the cooling assembly is spaced from the condenser by a gap.

2. The temperature calibration system of claim 1, further comprising compression springs having first ends coupled to a fixed component and second ends coupled to a movable component, the compression springs being biased to move the cooling assembly from the coupled position to the decoupled position.

3. The temperature calibration system of claim 1, further comprising a controller and one or more linear actuators that are coupled to the controller, the controller being configured to actuate the linear actuators to cause the cooling assembly to move from the decoupled position to the coupled position.

4. The temperature calibration system of claim 3, further comprising a temperature sensor coupled to the controller and configured to provide a signal indicative of a temperature of the condenser.

5. The temperature calibration system of claim 4, wherein the controller is configured to deactivate the linear actuators in response to receiving a signal from the temperature sensor indicating a temperature that is above a first threshold temperature, and to activate the linear actuators in response to receiving a signal from the temperature sensor indicating a temperature that is below a second threshold temperature.

6. The temperature calibration system of claim 1, wherein the cooling assembly includes a thermally conductive cap coupled to a portion of a cooling device.

7. The temperature calibration system of claim 1, wherein the gap is less than one inch.

8. A temperature calibration system, comprising:
a temperature calibration unit configured to receive one or more device elements to be calibrated;
a closed fluidic system configured to remove heat from the temperature calibration unit;
a cooling assembly configured to move between a coupled position, in which the cooling assembly is thermally coupled to a component of the closed fluidic system, and a decoupled position, in which the cooling assembly is thermally decoupled from the component of the closed fluidic system such that the cooling assembly is spaced apart from the component by a gap;
a temperature sensor positioned to sense a temperature in the closed fluidic system; and
a controller electrically coupled to the temperature sensor and configured to receive a first temperature signal from the temperature sensor, the first temperature signal being indicative of a first temperature in the closed fluidic system, the controller configured to compare the first temperature to a first threshold temperature,
wherein in response to the first temperature being at or above the first threshold temperature, the controller is configured to cause the cooling assembly to move to the decoupled position.

9. The temperature calibration system of claim 8, further comprising one or more linear actuators electrically coupled to the controller, the controller configured to activate the linear actuators to cause the cooling assembly to move to the coupled position.

10. The temperature calibration system of claim 9, wherein the controller is configured to receive a second temperature signal from the temperature sensor and compare the second temperature to a second threshold temperature, the controller being configured to activate the linear actuators in response to the second temperature being below the second threshold temperature.

11. The temperature calibration system of claim 10, wherein the first threshold temperature and the second threshold temperature are the same.

12. The temperature calibration system of claim 8, wherein the closed fluidic system is a thermosiphon or a heat pipe, and wherein the component of the closed fluidic system is a condenser of the thermosiphon or heat pipe.

13. The temperature calibration system of claim 8, wherein in the coupled position, the cooling assembly abuts the component of the closed fluidic system.

14. The temperature calibration system of claim 8, further comprising compression springs coupled between the cooling assembly and the closed fluidic system, wherein, in a natural state, the compression springs are configured to move the cooling assembly to the decoupled position.

15. A method, comprising:
placing a cooling assembly in a closed position in which the cooling assembly is abutting a component of a closed fluidic system, wherein in the closed position, the cooling assembly removes heat from the component of the closed fluidic system;
sensing a first temperature of the closed fluidic system;
comparing the first temperature to a first threshold temperature; and
in response the first temperature being equal to or greater than the first threshold temperature, moving the cooling assembly to a decoupled position in which cooling assembly is spaced apart from the component of the closed fluidic system.

16. The method of claim 15, comprising:
detecting a second temperature of the closed fluidic system;
comparing the second temperature to a second threshold temperature; and
in response to the second temperature being less than the second threshold temperature, moving the cooling assembly back to the coupled position in which the cooling assembly is abutting the component of the closed fluidic system.

17. The method of claim 15, wherein the closed fluidic system is a thermosiphon or a heat pipe and the component is a condenser.

18. The method of claim 16, wherein moving the cooling assembly to the coupled position comprises sending an electrical signal to activate a device that causes the cooling assembly to move to the coupled position.

19. The method of claim 15, wherein the component is a condenser, and wherein in the decoupled position, the cooling assembly is spaced apart from the condenser of the closed fluidic system by less than one inch.

20. The method of claim 15, wherein the cooling assembly is moved from the coupled position to the decoupled position by a spring force.

\* \* \* \* \*